(12) United States Patent
Jeong et al.

(10) Patent No.: US 11,818,395 B2
(45) Date of Patent: Nov. 14, 2023

(54) IMMERSIVE VIDEO DECODING METHOD AND IMMERSIVE VIDEO ENCODING METHOD

(71) Applicant: ELECTRONICS AND TELECOMMUNICATIONS RESEARCH INSTITUTE, Daejeon (KR)

(72) Inventors: Jun-Young Jeong, Daejeon (KR); Gwang-Soon Lee, Daejeon (KR); Jin-Hwan Lee, Daejeon (KR); Dawid Mieloch, Poznan (PL); Marek Domanski, Poznan (PL); Adrian Dziembowski, Poznan (PL)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/725,241

(22) Filed: Apr. 20, 2022

(65) Prior Publication Data

US 2022/0345742 A1 Oct. 27, 2022

(30) Foreign Application Priority Data

Apr. 22, 2021 (KR) .......................... 10-2021-0052591
Oct. 26, 2021 (KR) .......................... 10-2021-0143525
Apr. 4, 2022 (KR) .......................... 10-2022-0041559

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/105* (2014.11); *H04N 19/119* (2014.11);
(Continued)

(58) Field of Classification Search
CPC .. H04N 19/105; H04N 19/119; H04N 19/172; H04N 19/176; H04N 19/597; H04N 19/70
See application file for complete search history.

(56) References Cited

U.S. PATENT DOCUMENTS 10,771,781 B2 9/2020 Lee et al.
2015/0172714 A1* 6/2015 Wu .......................... H04N 19/96
375/240.12

(Continued)

FOREIGN PATENT DOCUMENTS

JP 2013-524681 A 6/2013
KR 10-2021-0122797 A 10/2021

OTHER PUBLICATIONS

Basel Salahieh et al., "Test Model 11 for MPEG Immersive Video", ISO/IEC JTC1/SC29/WG4 MPEG2021/N00142, Online, Oct. 29, 2021.

*Primary Examiner* — Michael J Hess
*Assistant Examiner* — Naod W Belai
(74) *Attorney, Agent, or Firm* — LRK PATENT LAW FIRM

(57) ABSTRACT

Disclosed herein are an immersive video decoding method and an immersive video encoding method. The immersive video decoding method includes partitioning a current picture into multiple main blocks, determining whether each main block is to be partitioned into multiple sub-blocks, and when it is determined that each main block is to be partitioned into multiple sub-blocks, determining a partitioning type of the corresponding main block. Here, the corresponding main block may be partitioned into four or two sub-blocks depending on the partitioning type. When the corresponding main block is partitioned into multiple sub-blocks, whether depth information is to be updated for each of the (Continued)

sub-blocks generated by partitioning the main block may be determined.

13 Claims, 9 Drawing Sheets

(51) Int. Cl.
*H04N 19/176* (2014.01)
*H04N 19/172* (2014.01)
*H04N 19/70* (2014.01)
*H04N 19/105* (2014.01)

(52) U.S. Cl.
CPC ......... *H04N 19/172* (2014.11); *H04N 19/176* (2014.11); *H04N 19/70* (2014.11)

(56) References Cited

U.S. PATENT DOCUMENTS

| | | |
|---|---|---|
| 2020/0252608 A1 | 8/2020 | Ramasubramonian et al. |
| 2020/0288150 A1 | 9/2020 | Jun et al. |
| 2021/0006778 A1* | 1/2021 | Kim ..................... H04N 19/119 |
| 2021/0176494 A1 | 6/2021 | Lee et al. |
| 2021/0227206 A1* | 7/2021 | Chiu ..................... H04N 19/105 |
| 2021/0377519 A1 | 12/2021 | Kim et al. |

* cited by examiner

| SPLIT TYPE / SEQUENCE | ☐ | ⊞ | ⊟ | ⊟ | ⊟ | ⊡ | ⊡ | ⊡ |
|---|---|---|---|---|---|---|---|---|
| SA | 73% | 7% | 14% | 2% | 2% | 2% | 1% | 1% |
| SB | 38% | 19% | 13% | 3% | 3% | 14% | 5% | 5% |
| SC | 50% | 11% | 6% | 1% | 1% | 22% | 4% | 4% |
| SD | 50% | 15% | 5% | 2% | 2% | 12% | 7% | 7% |
| SE | 60% | 11% | 7% | 4% | 4% | 8% | 4% | 4% |
| SI | 52% | 13% | 9% | 2% | 2% | 11% | 6% | 6% |
| SJ | 30% | 13% | 24% | 4% | 4% | 17% | 4% | 4% |
| SL | 58% | 9% | 7% | 2% | 2% | 12% | 5% | 5% |
| SN | 78% | 2% | 8% | 2% | 2% | 3% | 2% | 2% |
| SO | 34% | 31% | 7% | 2% | 2% | 14% | 5% | 5% |
| SP | 36% | 15% | 11% | 12% | 12% | 7% | 3% | 3% |
| SR | 31% | 22% | 5% | 2% | 2% | 22% | 8% | 8% |
| ST | 49% | 10% | 11% | 3% | 3% | 15% | 5% | 5% |
| SU | 44% | 11% | 18% | 9% | 9% | 5% | 2% | 2% |
| AVERAGE | 49% | 13% | 10% | 4% | 4% | 12% | 4% | 4% |

FIG. 11

| FLAG \ SPLIT TYPE | □ | ⊞ | ⊟ top | ⊟ bot | ⊟ | ⊪ | ⊪ L | ⊪ R |
|---|---|---|---|---|---|---|---|---|
| gas_split_flag | 0 | 1 | 1 | 1 | 1 | 1 | 1 | 1 |
| gas_quad_split_flag |  | 1 | 0 | 0 | 0 | 0 | 0 | 0 |
| gas_split_orientation_flag |  |  | 0 | 0 | 0 | 1 | 1 | 1 |
| gas_split_symmetry_flag |  |  | 1 | 0 | 0 | 1 | 0 | 0 |
| gas_split_first_block_bigger |  |  |  | 0 | 1 |  | 0 | 1 |

IMMERSIVE VIDEO DECODING METHOD AND IMMERSIVE VIDEO ENCODING METHOD

CROSS REFERENCE TO RELATED APPLICATIONS

This application claims the benefit of Korean Patent Application Nos. 10-2021-0052591, filed Apr. 22, 2021, 10-2021-0143525, filed Oct. 26, 2021, and 10-2022-0041559, filed Apr. 4, 2022, which are hereby incorporated by reference in their entireties into this application.

BACKGROUND OF THE INVENTION

1. Technical Field

The present invention relates generally to methods for encoding/decoding immersive video, which support motion disparity for rotation and translation.

2. Description of Related Art

Virtual-reality service has evolved into a technique for providing a service in which the sense of immersion and sense of realism are maximized by creating an omnidirectional video in the form of an actual image or a computer-generated (CG) image and playing the omnidirectional video on a Head-Mounted Display (HMD), a smartphone, or the like. It is known that, in order to play a natural and immersive omnidirectional video via an HMD, 6 Degrees of Freedom (DoF) must be supported. In the case of a 6DoF video, free images for six directions, such as (1) left/right (horizontal) rotation, (2) up/down (vertical) rotation, (3) left/right (horizontal) movement, and (4) up/down (vertical) movement, must be provided via an HMD screen. However, most current omnidirectional video based on actual images supports only rotational motion. Thus, research into fields related to technology for acquisition and reproduction of 6DoF omnidirectional video has been actively conducted.

Meanwhile, Korean Patent Application Publication No. 10-2021-0122797 entitled "Intra Prediction-Based Video Signal Processing Method and Device" discloses a video signal processing method and device which partition a current block into multiple rectangular transform blocks having various shapes in a horizontal or vertical direction, thus encoding or decoding video signals.

SUMMARY OF THE INVENTION

Accordingly, the present invention has been made keeping in mind the above problems occurring in the prior art, and an object of the present invention is to provide a method for encoding/decoding depth estimation information about a depth frame.

In detail, the present invention is intended to provide a method for encoding/decoding depth estimation information on a per-block basis.

The objects of the present invention are not limited to the above-mentioned objects, and those skilled in this art will be able to easily understand other unmentioned objects from the following description.

In accordance with an aspect of the present invention to accomplish the above object, there is provided an immersive video decoding method, including partitioning a current picture into multiple main blocks; determining whether each main block is to be partitioned into multiple sub-blocks; and when it is determined that each main block is to be partitioned into multiple sub-blocks, determining a partitioning type of the corresponding main block, wherein the corresponding main block is partitioned into four or two sub-blocks depending on the partitioning type, and wherein, when the corresponding main block is partitioned into multiple sub-blocks, whether depth information is to be updated for each of the sub-blocks generated by partitioning the main block is determined.

When it is determined that depth information of a first sub-block, among the multiple sub-blocks, is not to be updated, the depth information of the first sub-block may be set to depth information identical to depth information of a collocated block in a previous picture, corresponding to the first sub-block.

When it is determined that depth information of a first sub-block, among the multiple sub-blocks, is to be updated, depth estimation information for the first sub-block may be explicitly signaled through a bitstream, and the depth estimation information may include information about a difference in a minimum value of a depth range of the first sub-block and information about a difference in a maximum value of the depth range.

The minimum value of the depth range of the first sub-block may be derived as a sum of a prediction value for the minimum value of the depth range of the first sub-block and the difference in the minimum value of the depth range.

The prediction value for the minimum value of the depth range may be derived from any one of a top neighboring block and a left neighboring block of the first sub-block, and a syntax element for specifying any one of the top neighboring block and the left neighboring block may be decoded from the bitstream.

When the first sub-block is adjacent to a top boundary of the current picture, the prediction value may be derived from a left neighboring block of the first sub-block, and when the first sub-block is adjacent to a left boundary of the current picture, the prediction value may be derived from a top neighboring block of the first sub-block.

When the first sub-block is adjacent both to a top boundary and to a left boundary of the current picture, the prediction value may be set to a default value.

In accordance with another aspect of the present invention to accomplish the above object, there is provided an immersive video encoding method, including partitioning a current picture into multiple main blocks, determining whether each main block is to be partitioned into multiple sub-blocks, and determining a partitioning type of the corresponding main block, wherein the corresponding main block may be partitioned into four or two sub-blocks depending on the partitioning type, and wherein whether the corresponding main block is to be partitioned may be determined based on whether a difference between a maximum value and a minimum value of a depth range of the main block is greater than a first threshold value.

The partitioning type of the main block may be selected from among one or more partitioning type candidates that are usable in the main block, among multiple partitioning type candidates, and the partitioning type candidates may include at least one of square-type partitioning, symmetric horizontal rectangular-type partitioning, symmetric vertical rectangular-type partitioning, asymmetric horizontal rectangular-type partitioning, and asymmetric vertical rectangular-type partitioning.

Whether a first partitioning type candidate, among the multiple partitioning type candidates, is usable in the main block may be determined based on whether difference information of at least one of sub-blocks generated when the first partitioning type candidate is applied to the main block is greater than a second threshold value, and the difference information may be a difference between a maximum value and a minimum value of a depth range of the corresponding sub-block.

The immersive video encoding method may further include determining whether depth estimation information for a first sub-block generated by partitioning the main block is to be explicitly encoded.

Determining whether the depth estimation information for the first sub-block is to be explicitly encoded may be performed based on a result of a comparison between depth information of a collocated block in a previous frame, corresponding to the first sub-block, and depth information of the first sub-block.

The depth estimation information may include a difference between a minimum value of a depth range of the first sub-block and a prediction value for the minimum value of the depth range, and the prediction value for the minimum value of the depth range may be a minimum value of a depth range of a top neighboring block or a left neighboring block of the first sub-block.

BRIEF DESCRIPTION OF THE DRAWINGS

The above and other objects, features, and advantages of the present invention will be more clearly understood from the following detailed description taken in conjunction with the accompanying drawings, in which:

FIG. 11 is a diagram illustrating the results of experiments for testing the probabilities of partitioning types (split types) occurring in a test sequence according to an embodiment of the present invention;

DESCRIPTION OF THE PREFERRED EMBODIMENTS

Figure 1:
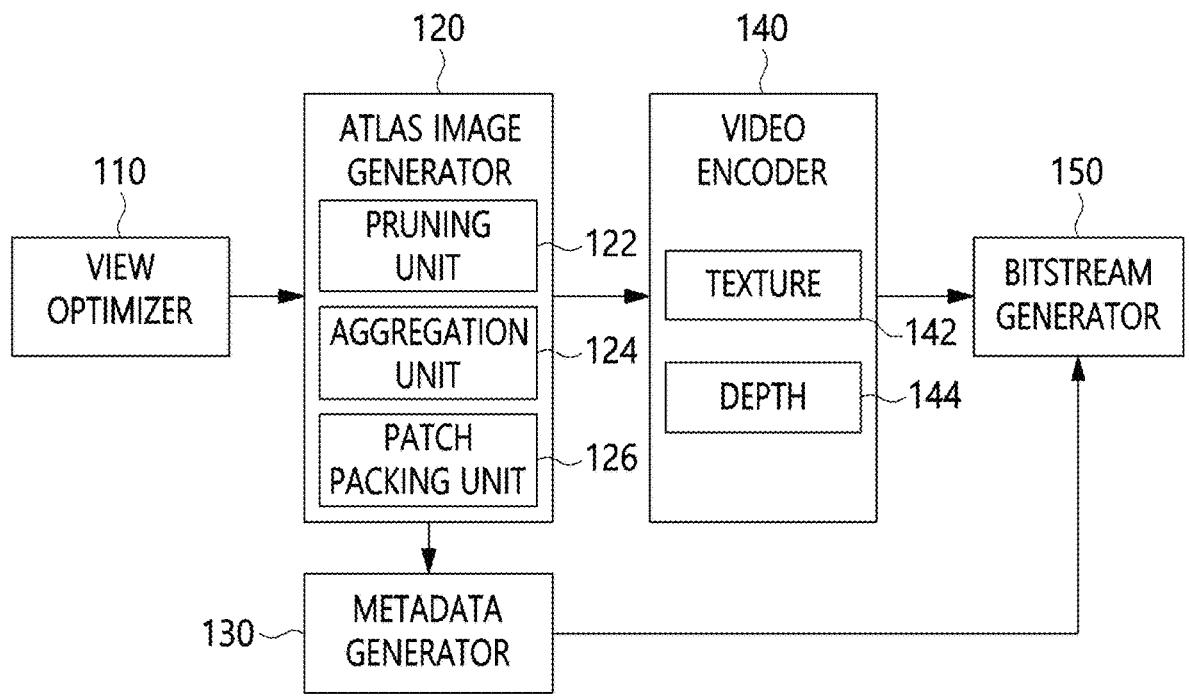
FIG. 1 is a block diagram of an immersive video processing apparatus according to an embodiment of the present invention.

The present invention may have various changes and various embodiments, and specific embodiments will be illustrated in the attached drawings and described in detail below. However, this is not intended to limit the present invention to particular modes of practice, and it is to be appreciated that all changes, equivalents, and substitutes that do not depart from the spirit or technical scope of the present invention are encompassed in the present invention.

In the drawings, similar reference numerals are used to designate the same or similar functions in various aspects. The shapes, sizes, etc. of components in the drawings may be exaggerated to make the description clear.

Detailed descriptions of the following exemplary embodiments will be made with reference to the attached drawings illustrating specific embodiments. These embodiments are described so that those having ordinary knowledge in the technical field to which the present invention pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the invention, and the scope of the exemplary embodiments is limited only by the accompanying claims, along with equivalents thereof, as long as they are appropriately described.

In the present invention, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present invention. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The component units described in the embodiments are independently shown in order to indicate different characteristic functions, but this does not mean that each of the component units is formed of a separate piece of hardware or software. That is, component units are arranged and included separately for convenience of description. For example, at least two of the component units may be integrated into a single component unit. Conversely, one component unit may be divided into multiple component units. An embodiment into which the component units are integrated or an embodiment in which some component units are separated is included in the scope of the present specification, as long as it does not depart from the essence of the present specification.

The terms used in the present invention are merely used to describe specific embodiments and are not intended to limit the present invention. A singular expression includes a plural expression unless a description to the contrary is specifically pointed out in context. In the present invention, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, it should be noted that, in the present invention, an expression describing that a component "comprises" a specific component means that additional components may be included in the scope of the practice or the technical spirit of the embodiments, but do not preclude the presence of components other than the specific component.

Some components in the present invention are not essential components for performing essential functions, but may be optional components for improving only performance. The present invention may be implemented using only essential components for implementing the essence of the invention. For example, a structure including only essential components, excluding optional components used only to improve performance, is also included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted. It should be noted that the same reference numerals are used to designate the same or similar components throughout the drawings, and that descriptions of the same components will be omitted.

"Immersive video" denotes a video, the viewport of which can be dynamically changed when the viewing position of a user is changed. In order to implement immersive video, multiple input images are required. Respective input images may be referred to as source images or view images. Different view indices may be assigned to respective view images.

The immersive video may be classified into 3 Degrees of Freedom (DoF), 3DoF+, Windowed-6DoF, and 6DoF types. 3DoF-based immersive video may be implemented using only texture images. Meanwhile, in order to render an immersive video such as a 3DoF+ or 6DoF video, including depth information, a depth image as well as texture images may be required.

It is assumed that embodiments to be described later are implemented to process immersive videos, such as 3DoF+ and/or 6DoF videos, including depth information. Further, it is assumed that a view image is composed of a texture image and a depth image.

FIG. 1 is a block diagram illustrating an immersive video processing apparatus according to an embodiment of the present invention.

Referring to FIG. 1, the immersive video processing apparatus according to the embodiment of the present invention may include a view optimizer 110, an atlas generator 120, a metadata generator 130, a video encoder 140, and a bitstream generator 150.

The immersive video processing apparatus receives multiple pairs of images, intrinsic camera parameters, and extrinsic camera parameters as input values, and then encodes an immersive video. Here, the multiple pairs of images may include texture images (attribute components) and depth images (geometry components). Respective pairs may have different views. Accordingly, a pair of input images may be designated as view images. Respective view images may be identified by indices thereof. In this case, indices assigned to respective view images may be designated as "views" or "view indices".

The intrinsic camera parameters may include a focal length, a main point position, etc., and the extrinsic camera parameters may include the position, orientation, etc. of each camera. The intrinsic camera parameters and the extrinsic camera parameters may be treated as camera parameters or view parameters.

The view optimizer 110 divides the view images into multiple groups. The view images are divided into multiple groups, and thus independent encoding processing may be performed for each group. For example, view images captured by N spatially consecutive cameras may be combined into respective groups. By means thereof, view images having relatively coherent depth information may be combined into a single group, thus improving rendering quality.

Further, since information dependency between respective groups may be removed, a spatial random access service that enables only information about the area currently being viewed by a user to be selectively loaded and performs rendering on the loaded information may be performed.

Whether the view images are to be divided into multiple groups may be optionally determined.

Further, the view optimizer 110 may classify view images into a base image and additional images. The base image may be a view image that has the highest pruning priority and that is not pruned, and the additional image may be view images having a pruning priority lower than that of the base image.

The view optimizer 110 may determine at least one of view images to be a base image. The view images not selected as the base image may be classified as additional images.

The view optimizer 110 may determine the base image in consideration of the viewing positions of the view images. For example, a view image, the view position of which is the center, among the multiple view images, may be selected as the base image.

Alternatively, the view optimizer 110 may select the base image based on camera parameters. In detail, the view optimizer 110 may select the base image based on at least one of camera indices, priorities between cameras, the positions of cameras, and information about whether the corresponding camera is a camera present in a region of interest.

For example, at least one of the view image having the smallest camera index, the view image having the largest camera index, a view image having a camera index equal to a predefined value, a view image captured by the camera having the highest priority, a view image captured by the camera having the lowest priority, a view image captured by a camera at a predefined position (e.g., a central position), and a view image captured by a camera present in a region of interest may be determined to be the base image.

Alternatively, the view optimizer 110 may determine the base image based on the quality of the view images. For example, the view image having the highest quality, among the view images, may be determined to be the base image.

Alternatively, the view optimizer 110 may check the extent of data redundancy between the view images, and may thereafter determine the base image based on the data redundancy rates of other view images. In an example, the view image having the highest rate of data redundancy with other view images or the view image having the lowest rate of data redundancy with other view images may be determined to be the base image.

Multiple view images may be set as base images.

The atlas generator 120 generates a pruning mask by performing pruning. Also, the atlas generator 120 extracts patches using the pruning mask, and generates an atlas by combining the base image and/or the extracted patches. When the view images are divided into multiple groups, the above-described process may be independently performed for each group.

The generated atlas may be composed of a texture atlas and a depth atlas. The texture atlas denotes an image in which a base texture image and/or texture patches are combined with each other, and the depth atlas denotes an image in which a base depth image and/or depth patches are combined with each other.

The atlas generator 120 may include a pruning unit 122, an aggregation unit 124, and a patch packing unit 126.

The pruning unit 122 may perform pruning on the additional images based on a pruning priority. In detail, pruning of the additional images may be performed using a reference image having a pruning priority higher than that of the additional images.

The reference image includes the base image. In addition, the reference image may further include other additional images depending on the pruning priority of the additional images.

Whether an additional image is usable as the reference image may be selectively determined. For example, when the additional image is designated not to be used as a reference image, only the base image may be set as the reference image.

Meanwhile, when an additional image is designated to be usable as a reference image, another additional image having a pruning priority higher than those of the base image and the additional image may be set as the reference image.

Through a pruning procedure, redundant data between the additional image and the reference image may be removed. In detail, through a warping procedure based on a depth image, redundant data overlapping the reference image may be removed from the additional image. For example, depth values of the additional image and the reference image may be compared with each other, and the corresponding pixel may be determined to be redundant data if the difference between the depth values is less than or equal to a threshold value.

As a result of performing pruning, a pruning mask including information indicating whether each pixel in the additional image is valid or invalid may be generated. The pruning mask may be a binary image indicating whether each pixel in the additional image is valid or invalid. In an example, in the pruning mask, a pixel determined to be redundant data overlapping the reference image may have a value of 0, and a pixel determined not to be redundant data overlapping the reference image may have a value of 1.

A non-redundant area may have a non-rectangular shape, whereas each patch is limited to a rectangular shape.

Accordingly, the patch may include not only a valid area but also an invalid area. Here, the term "valid area" means an area composed of non-redundant pixels between the additional image and the reference image. That is, the valid area refers to an area including data that is included in the additional image, but is not included in the reference image. The term "invalid area" means an area composed of redundant pixels between the additional image and the reference image. Pixels/data included in the valid area may be referred to as "valid pixels/valid data", and pixels/data included in the invalid area may be referred to as "invalid pixels/invalid data".

The aggregation unit 124 may combine pruning masks, generated on a frame basis, in units of intra-periods.

Also, the aggregation unit 124 may extract a patch from an image of the combined pruning masks through a clustering procedure. In detail, a rectangular area including valid data in the combined pruning mask image may be extracted as the patch. Regardless of the shape of the valid area, the patch may be extracted in a rectangular shape, and a patch extracted from a non-rectangular valid area may include not only valid data but also invalid data.

Here, the aggregation unit 124 may re-partition an L-shaped patch or a C-shaped patch which deteriorates coding efficiency. Here, the L-shaped patch means that the distribution of a valid area has an L shape, and the C-shaped patch means that the distribution of a valid area has a C shape.

When the distribution of a valid area has an L shape or a C shape, a portion occupied by an invalid area in the patch is relatively large. Accordingly, the L-shaped or C-shaped patch is partitioned into multiple patches, and thus improvement of coding efficiency may be promoted.

In the case of an unpruned view image, the entire view image may be treated as a single patch. In detail, the entire two-dimensional (2D) image, obtained by expanding an unpruned view image in a predetermined projection format, may be treated as a single patch. A projection format may include at least one of an Equirectangular Projection (ERP) format, a cube-map format, and a perspective projection format.

Here, the term "unpruned view image" refers to the base image having the highest pruning priority. Alternatively, an additional image in which redundant data overlapping the base image and the reference image is not present may also be defined as an unpruned view image. Alternatively, regardless of whether redundant data overlapping a reference image is present, an additional image arbitrarily excluded from a pruning target may be defined as an unpruned view image. That is, even an additional image in which redundant data overlapping a reference image is present may be defined as an unpruned view image.

The packing unit 126 packs patches into a rectangular image. Packing of the patches may be accompanied by modification such as size conversion, rotation, or flipping of the patches. An image packed with the patches may be defined as an atlas.

In detail, the packing unit 126 may generate a texture atlas by packing a base texture image and/or texture patches, and may generate a depth atlas by packing a base depth image and/or depth patches.

The entire base image may be treated as one patch. That is, the base image may be packed into an atlas without change. When the entire image is treated as one patch, the corresponding patch may be referred to as a complete image (complete view) or a complete patch.

The number of atlases generated by the atlas generator 120 may be determined based on at least one of the array structure of camera rigs, the accuracy of a depth map, and the number of view images.

The metadata generator 130 may generate metadata for image composition. The metadata may include at least one of camera-related data, pruning-related data, atlas-related data, and patch-related data.

The pruning-related data may include pieces of information required in order to determine pruning priorities of view images. In an example, at least one of a flag indicating whether the corresponding view image is a root node and a flag indicating whether the view image is a leaf node may be encoded. The root node indicates the view image having the highest pruning priority (i.e., a base image), and the leaf node indicates the view image having the lowest pruning priority.

When a view image is not a root node, a parent node index may be additionally encoded. The parent node index may indicate the image index of a view image that is a parent node.

Alternatively, when a view image is not a leaf node, a child node index may be additionally encoded. The child node index may indicate the image index of a view image that is a child node.

The atlas-related data may include at least one of information about the size of each atlas, information about the number of atlases, information about the priorities of atlases, and a flag indicating whether each atlas includes a complete image. The atlas size may include at least one of size information of a texture atlas and size information of a depth atlas. In this case, a flag indicating whether the size of the depth atlas is identical to that of the texture atlas may be additionally encoded. When the size of the depth atlas is different from that of the texture atlas, the reduction ratio information of the depth atlas (e.g., scaling-related information) may be additionally encoded. The atlas-related data may be included in the "view parameters list" field in a bitstream.

For example, the syntax element geometry_scale_enabled_flag indicating whether reduction (downscaling) of the depth atlas is permitted may be encoded/decoded. When the value of the syntax element geometry_scale_enabled_flag is equal to 0, this means that reduction of a depth atlas is not permitted. In this case, the depth atlas has the same size as the texture atlas.

When the value of the syntax element geometry_scale_enabled_flag is equal to 1, this means that reduction of a depth atlas is permitted. In this case, information required to determine the reduction ratio of the depth atlas may be additionally encoded/decoded. For example, the syntax element geometry_scaling_factor_x indicating the horizontal reduction ratio of the depth atlas and the syntax element geometry_scaling_factor_y indicating the vertical reduction ratio of the depth atlas may be additionally encoded/decoded.

An immersive video output (display) apparatus may decode information about the reduction ratio of the depth atlas, and may then reconstruct the reduced depth atlas at the original size.

The patch-related data includes pieces of information required in order to specify the location and/or size of patches in the atlas image, the view image to which the patches belong, and the location and/or the size of the patches in the view image. For example, at least one of location information indicating the location of patches in the atlas image and size information indicating the size of patches in the atlas image may be encoded. Further, a source index for identifying the view image from which the patches originate may be encoded. The source index indicates the index of the view image that is the origin of the patches. Further, at least one of location information indicating the location of patches in the view image and size information indicating the size of the patches in the view image may be encoded. The patch-related information may be included in the "atlas data" field in a bitstream.

The video encoder 140 encodes the atlases. When view images are divided into multiple groups, atlases may be generated for respective groups. Accordingly, video encoding may be performed independently for each group.

The video encoder 140 may include a texture image encoder unit 142 for encoding a texture atlas and a depth image encoder unit 144 for encoding a depth atlas.

The bitstream generator 150 generates a bitstream based on encoded video data and metadata. The generated bitstream may be transmitted to the immersive video output apparatus.

Figure 2:
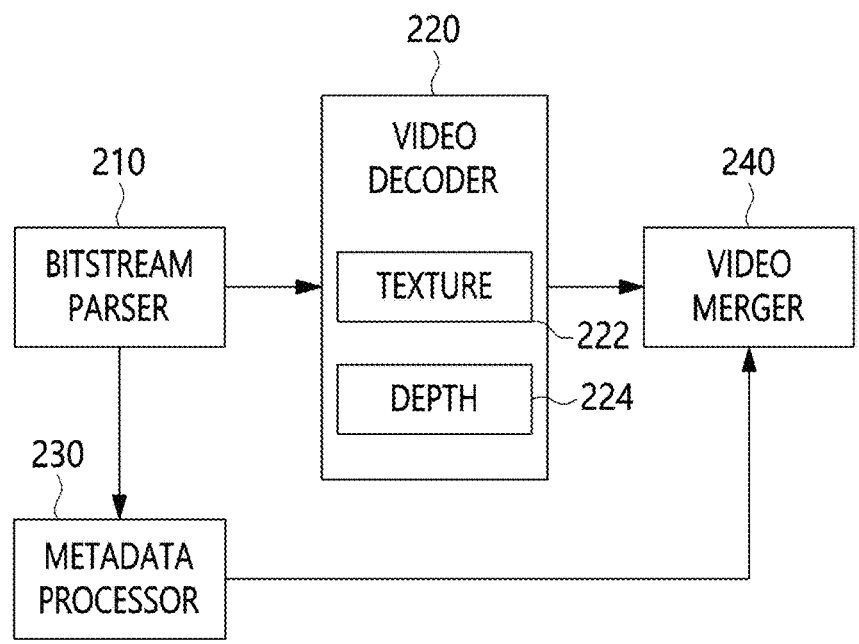
FIG. 2 is a block diagram of an immersive video output apparatus according to an embodiment of the present invention.

FIG. 2 is a block diagram illustrating an immersive video output apparatus according to an embodiment of the present invention.

Referring to FIG. 2, the immersive video output apparatus according to the embodiment of the present invention may include a bitstream parser 210, a video decoder 220, a metadata processor 230, and a video synthesizer 240.

The bitstream parser 210 may parse video data and metadata from a bitstream. The video data may include data about encoded atlases. When a spatial random access service is supported, only a partial bitstream including the viewing position of a user may also be received.

The video decoder 220 decodes parsed video data. The video decoder 220 may include a texture image decoder unit 222 for decoding a texture atlas and a depth image decoder unit 224 for decoding a depth atlas.

The metadata processor 230 unformats the parsed metadata.

The unformatted metadata may be used to synthesize images at specific views. For example, when motion information of the user is input to the immersive video output apparatus, the metadata processor 230 may determine atlases required for video synthesis, patches required for video synthesis, the location/size of patches in the atlases, etc. in order to reproduce a viewport image depending on the motion of the user.

The video synthesizer 240 may dynamically synthesize viewport images depending on the motion of the user. In detail, the video synthesizer 240 may extract patches required in order to synthesize viewport images from the atlases using information determined by the metadata processor 230 depending on the motion of the user. In detail, the atlases including the information of view images required to synthesize viewport images may be determined, patches may be extracted from the view images in the atlases, and the extracted patches may be synthesized to generate a viewport image.

Figure 3:
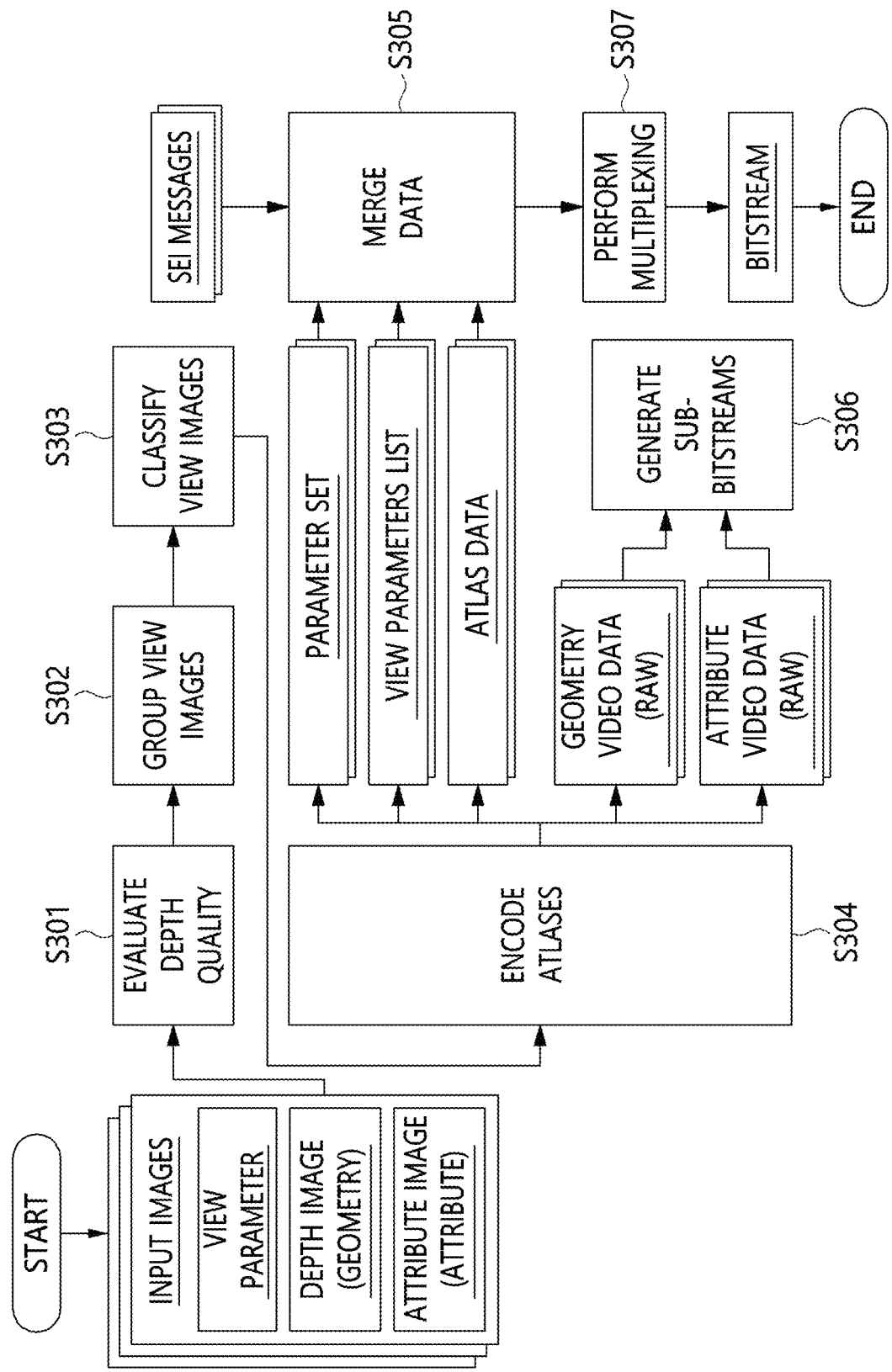
FIG. 3 is an operation flow diagram illustrating an immersive video processing method according to an embodiment of the present invention.
Figure 5:
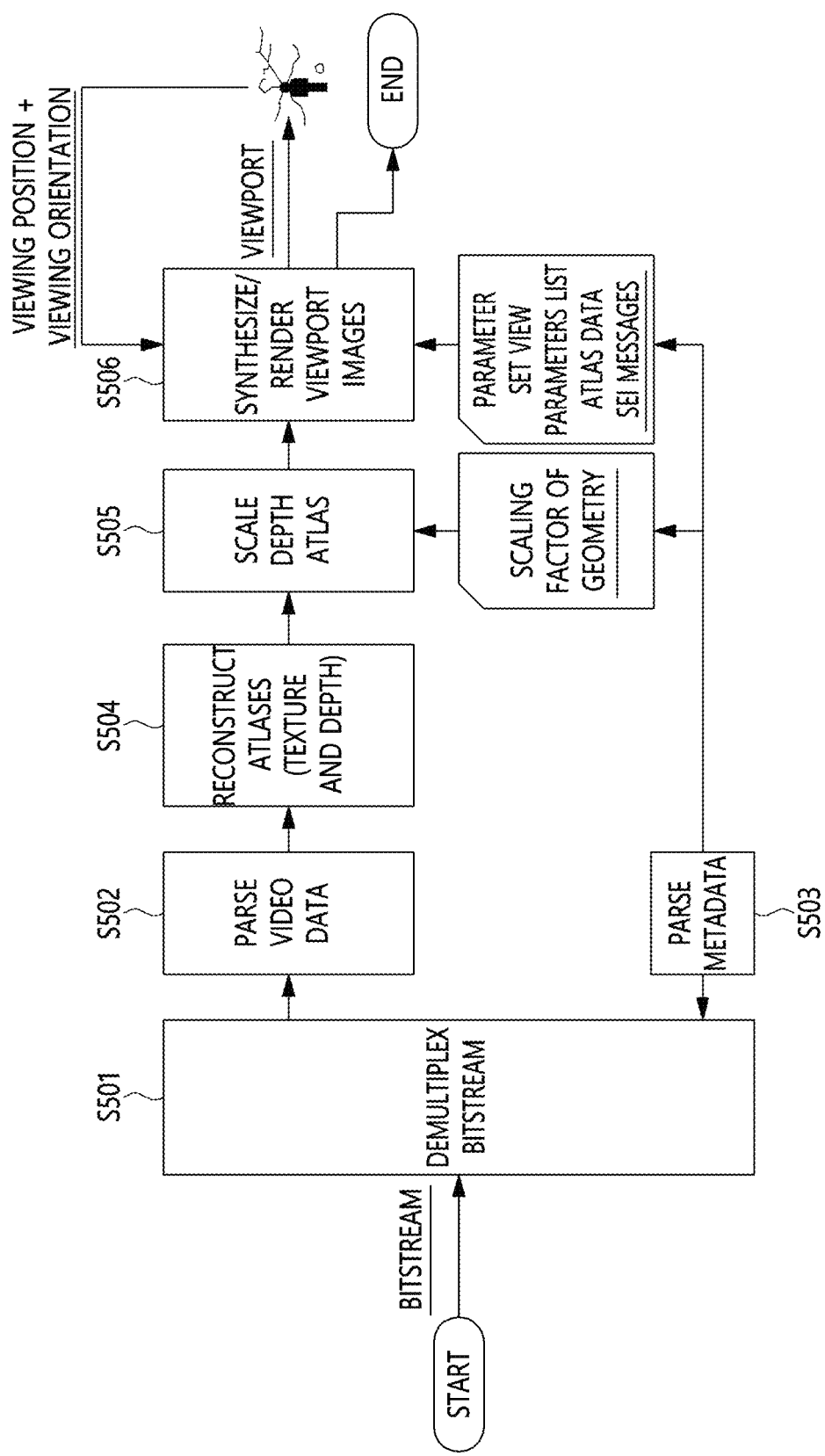
FIG. 5 is an operation flow diagram illustrating an immersive video output method according to an embodiment of the present invention.

FIGS. 3 and 5 are flow diagrams illustrating an immersive video processing method and an immersive video output method, respectively.

In the following flow diagrams, letters that are in italics or underlined denote input or output data required in order to perform each step. Further, in the following flow diagrams, arrows indicate the processing sequence of individual steps. Here, steps that are not connected by arrows may mean that the temporal sequence between the corresponding steps is not determined or that the corresponding steps may be processed in parallel. Also, it is also possible to process or output (display) immersive video in a sequence different from that illustrated in the following flow diagrams.

The immersive video processing apparatus may receive multiple input images and at least one of intrinsic camera parameters and extrinsic camera parameters, and may evaluate the quality of a depth map based on the received data at step S301. Here, the input images may be implemented as one pair including a texture image (i.e., an attribute component) and a depth image (i.e., a geometry component).

The immersive video processing apparatus may sort the input images into multiple groups based on position proximity to multiple cameras at step S302. The input images may be sorted into multiple groups, and thus pruning and encoding may be independently performed by adjacent cameras having a relatively coherent depth value. Also, through the above procedure, a spatial random access service in which rendering is performed using only information in the area currently being viewed by a user may be performed.

However, the above-described steps S301 and S302 are only selective procedures, and the present procedures are not necessarily performed.

When the input images are sorted into multiple groups, procedures to be described later may be independently performed for respective groups.

The immersive video processing apparatus may determine the pruning priorities of view images at step S303. More specifically, the view images may be classified into a base image and additional images, and the pruning priorities of the additional images may be set.

Figure 4:
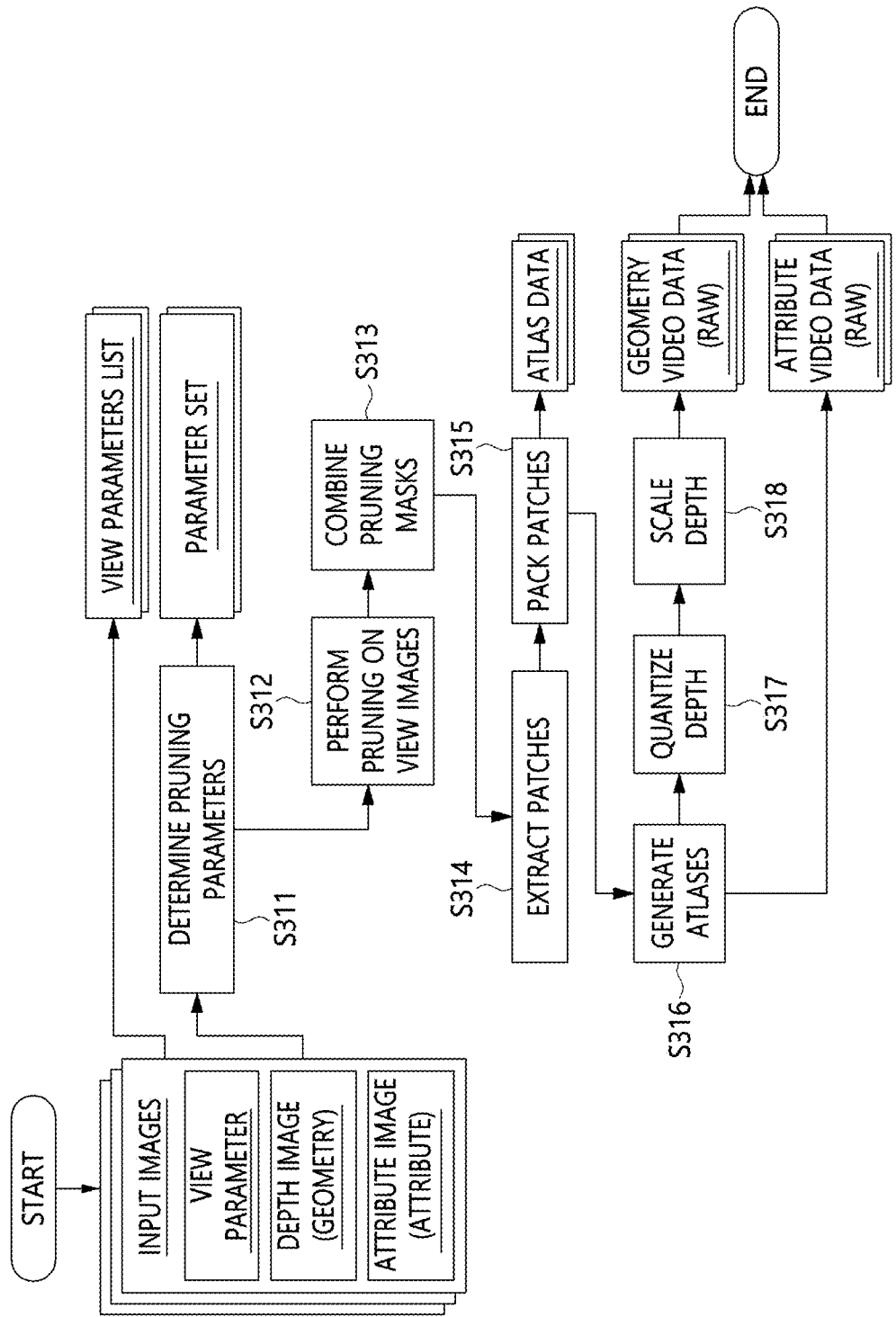
FIG. 4 is an operation flow diagram illustrating an atlas encoding process according to an embodiment of the present invention.

Thereafter, atlases may be generated based on the pruning priorities, and the generated atlases may be encoded at step S304. The process of encoding atlases is illustrated in detail in FIG. 4.

In detail, pruning parameters (e.g., a pruning priority or the like) may be determined at step S311, and pruning may be performed on view images based on the determined pruning parameters at step S312. As a result of performing pruning, the base image having the highest priority is maintained without change. Meanwhile, through pruning of the additional images, redundant data between the additional images and reference images is removed. The redundant data between the additional images and the reference images may be removed through a warping procedure based on the depth image.

Pruning masks may be generated as a result of performing pruning. When the pruning masks are generated, the pruning masks are combined with each other in units of intra-periods at step S313. Then, patches may be extracted from texture images and depth images using the combined pruning masks at step S314. In detail, the patches may be extracted by masking the texture images and the depth images with the combined pruning masks.

Here, for an unpruned view image (e.g., the base image), the entire view image may be treated as a single patch.

Thereafter, the extracted patches may be packed at step S315, and atlases may be generated at step S316. In detail, a texture atlas and a depth atlas may be generated.

Further, the immersive video processing apparatus may set a threshold value that is required in order to determine, based on the depth atlas, whether the corresponding pixel is valid or invalid at step S317. In an example, a pixel, the value of which in each atlas is less than a threshold value, may correspond to an invalid pixel, and a pixel, the value of which in each atlas is equal to or greater than the threshold value, may correspond to a valid pixel. The threshold value may be determined on an image basis, or on a patch basis.

In order to reduce the amount of data, the size of the depth atlas may be reduced (scaled) at a specific ratio at step S318. When the size of the depth atlas is reduced, information about the reduction ratio (e.g., a scaling factor) of the depth atlas may be encoded. The immersive video output apparatus may reconstruct the size of the texture atlas and the size of the depth atlas, reduced through the scaling factor, to the original sizes thereof.

The metadata (e.g., a parameter set, a view parameter list or atlas data) generated in the atlas-encoding process is combined with Supplemental Enhancement Information (SEI) at step S305. Also, sub-bitstreams may be generated by respectively encoding the texture atlas and the depth atlas at step S306. Further, a single bitstream may be generated by multiplexing the encoded metadata and the encoded atlases at step S307.

The immersive video output apparatus demultiplexes the bitstream received from the immersive video processing apparatus at step S501. As a result, video data, that is, atlas data and metadata, may be respectively extracted (parsed) at steps S502 and S503.

The immersive video output apparatus may reconstruct atlases based on the parsed video data at step S504. Here, when the depth atlas is reduced at a specific ratio, related information may be acquired from the metadata, and the depth atlas may be scaled to the original size at step S505.

When motion of the user occurs, an atlas required for viewport image synthesis depending on the motion of the user may be determined based on the metadata, and patches included in the atlas may be extracted. A viewport image may be generated and rendered at step S506. Here, in order to synthesize the generated patches, size/location information of each patch, camera parameters, etc. may be used.

The video-processing method proposed in the present invention will be described in detail below based on the detailed descriptions.

Values, derived by taking a reciprocal of a distance m between the corresponding camera and an object, may be normalized, and normalized values (disparity values) may be mapped to depth values. In detail, the value, obtained by taking the reciprocal of the distance, may be defined as a disparity represented in metric units (1/m). Each normalized disparity may be represented by one value (e.g., a depth value) falling within a pixel range of values which can be represented by each pixel in the depth image. Here, a normalized disparity value mapped to the maximum value falling within the pixel range may be defined as a maximum normalized disparity value, and a normalized disparity value mapped to the minimum value falling within the pixel range may be defined as a minimum normalized disparity value. In an example, in an N-bit image, a normalized disparity value mapped to a pixel value of $(2^N-1)$ may be defined as the maximum normalized disparity value, and a normalized disparity value mapped to a pixel value of 0 may be defined as the minimum normalized disparity value.

The following Equation (1) shows an example in which each pixel value is converted into a pixel value in a depth image using a normalized disparity value represented in metric units (in meters) (1/m).

$$\text{SampleValue}=(\text{NormDisparity}-\text{NormDispMin})/(\text{NormDispMax}-\text{NormDispMin})*\text{MaxSampleValue} \quad (1)$$

In Equation (1), SampleValue denotes a pixel value in a depth map (i.e., a depth value), and NormDisparity denotes a normalized disparity value (1/m) represented in metric units (1/m). NormDispMin denotes a minimum normalized disparity value, and NormDispMax denotes a maximum normalized disparity value. MaxSampleValue denotes the maximum pixel range that can be represented by one pixel. For example, for an N-bit image, MaxSampleValue may be set to (2N−1). Here, the depth map may denote a picture (frame) composed of depth information, and may indicate, for example, a depth atlas.

The depth range (i.e., geometry range) may be defined as a range from the minimum value to the maximum value in the depth map.

Figure 6:
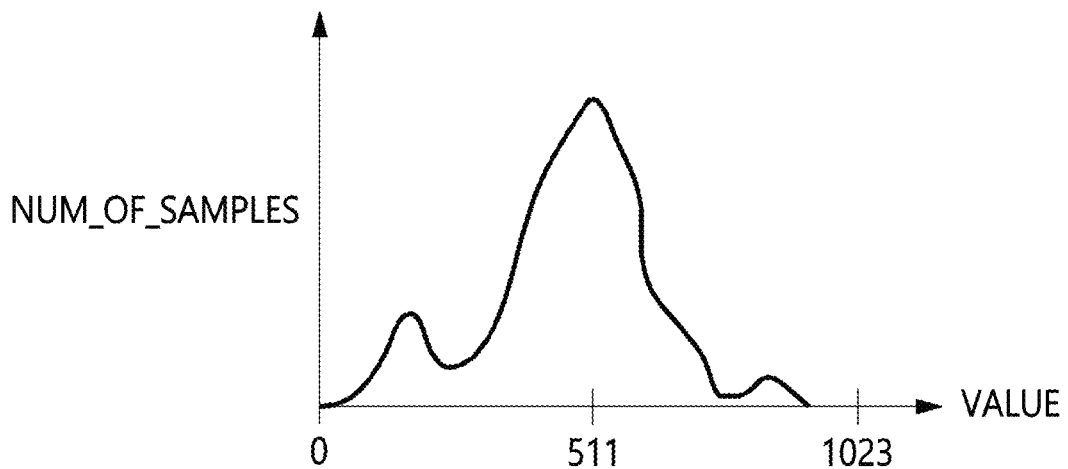
FIG. 6 is a diagram illustrating the distribution of pixel values in a depth atlas according to an embodiment of the present invention.

FIG. 6 is a diagram illustrating the distribution of pixel values in a depth map according to an embodiment of the present invention.

In a 10-bit image, normalized disparity values may be represented by values ranging from 0 to 1023, as shown in the example illustrated in FIG. 6. That is, in the 10-bit image, respective pixels in the depth map may have values ranging from 0 to 1023. Accordingly, the maximum representable depth range may be defined as an interval from 0 to 1023. For example, when the minimum value of actual depth values is 12 and the maximum value thereof is 956, the depth range may be defined as a range from 12 to 956.

The depth value may be quantized and encoded/decoded. In this case, the depth range may be defined as a range from the minimum value to the maximum value of quantized depth values.

In order to improve speed and accuracy when depth value estimation (or depth estimation) is performed by the decoder, information required to estimate the depth map may be encoded in the bitstream. As described above, the information required to estimate the depth map may be referred to as 'depth estimation information'.

The depth estimation information may include information about the minimum value and/or information about the maximum value of the depth range. Also, initial variation values may be obtained through stereo matching between various view pairs, and the depth estimation information may include an optimized smoothing coefficient for obtaining optimal depth information using the initial variation values.

Furthermore, information indicating the size of a quantization step used to quantize depth values may be encoded and signaled. In an example, the syntax element gas_qs indicating the size of a quantization step may be encoded/decoded.

In order to consider the efficiency of depth estimation, the depth map may be split into multiple blocks. This will be described in detail below.

The encoder may divide depth information, which is complicated but is estimated to have high performance, or high-precision depth information, which is output from a depth sensor, into multiple blocks, and may output depth estimation information for depth extraction for each block obtained through the division. Here, the depth estimation information may include at least one of information about the depth range and the optimized smoothing coefficient. Also, the information about the depth range may include information about a minimum depth value in a block (i.e., the minimum value of the depth range) and information about a maximum depth value (i.e., the maximum value of the depth range) in the block.

The encoder may encode depth estimation information with reference to depth information (i.e., depth value) of each pixel in the block. The decoder may acquire the depth information (i.e., depth value) of each pixel based on the depth estimation information.

Figure 7:
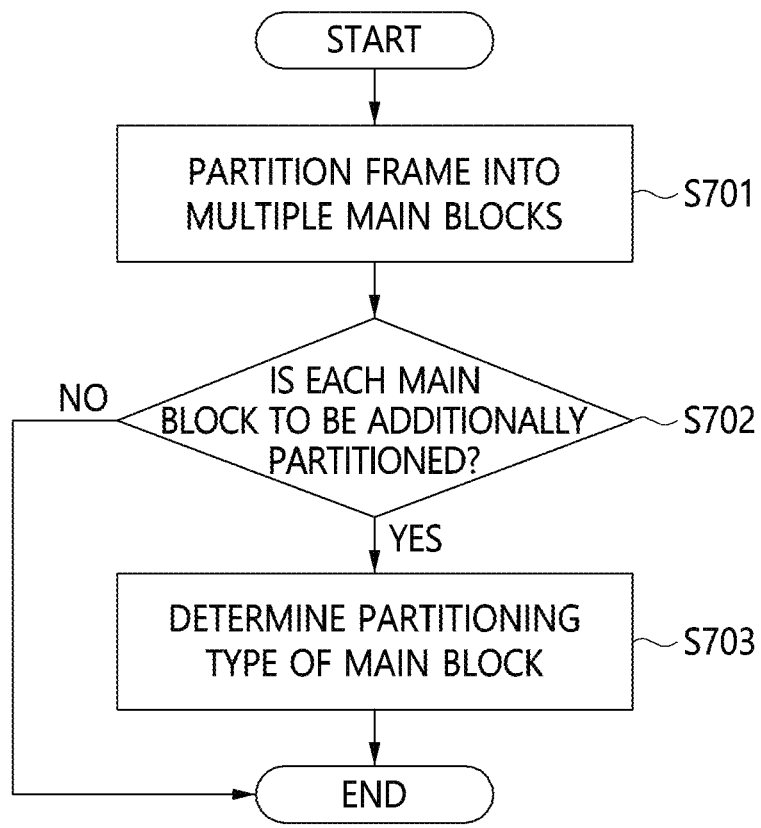
FIG. 7 is a flowchart illustrating an example in which an encoder partitions one frame into multiple blocks according to an embodiment of the present invention.

FIG. 7 is a diagram illustrating an example in which an encoder partitions one frame into multiple blocks according to an embodiment of the present invention.

First, the encoder may partition one frame into multiple main blocks at step S701. The location of the top-left corner of a first block, among the main blocks, may be consistent with that of the top-left corner of the picture (frame).

Each main block may be a square block having a size predefined by the encoder and the decoder. Alternatively, information indicating the size of the main block may be explicitly encoded and signaled. For example, information indicating a value obtained by taking the function Log_2 with respect to the width, height, or size (e.g., width×height) of the main block, or a value obtained by subtracting an offset (e.g., 1 or 2) from the value obtained by taking the function Log_2 may be explicitly encoded and signaled. In an example, the syntax element gas_bw indicating the size of the main block may be explicitly encoded/decoded. The syntax element gas_bw may indicate the width and/or height of the main block.

By utilizing the syntax element gas_bw, the variable maxBlockSize related to the size of the main block may be derived. In this case, the main block may be a square block having a width and a height corresponding to maxBlockSize. Here, the main block may be designated to have a predefined size. For example, each of the width and height of the main block may have a value equal to or greater than 16.

After one frame is partitioned into the main blocks, whether each main block is to be additionally partitioned may be determined based on the depth range of the corresponding main block at step S702. In detail, when the difference between the maximum value Zmax of the depth range in the main block and the minimum value Zmin of the depth range is greater than a threshold value, the main block may be partitioned into multiple partitions (or sub-blocks). The following Equation (2) shows an example in which whether the main block is to be partitioned is determined based on the depth range.

$$\text{if}(Zmax-Zmin>\text{partitionThresh})\text{doPartition} \quad (2)$$

In Equation (2), the variable partitionThresh denotes a threshold value. When the difference between the maximum value Zmax and the minimum value Zmin of the depth range is greater than the variable partitionThresh, the function doPartition for main block partitioning may be executed.

The threshold value may be predefined by the encoder and the decoder. Alternatively, information indicating the threshold value may be explicitly encoded and signaled.

The main block may be set such that only square-type partitioning is usable for the main block. Here, the term "square-type partitioning" means that sub-blocks, generated by partitioning the main block, take square shapes. When square-type partitioning is applied, the main block may be partitioned into four sub-blocks. Accordingly, square-type partitioning may also be referred to as "quad-type partitioning". When square-type partitioning is applied, the width and height of each of the sub-blocks generated by partitioning the main block, may be set to ½ of the width and height of the main block.

In addition to square-type partitioning, rectangular-type partitioning may also be designated as usable. The rectangular-type partitioning means that a block is partitioned into two sub-blocks. Accordingly, rectangular-type partitioning may also be referred to as "binary-type partitioning".

Figure 8:
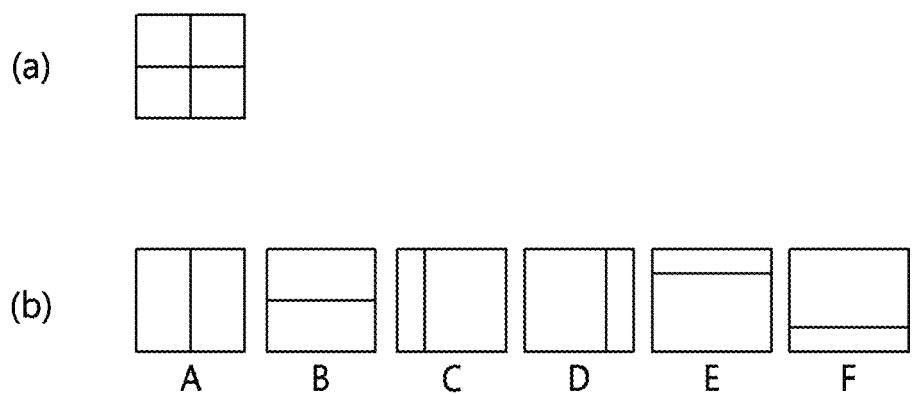
FIG. 8 is a diagram illustrating an example of the case where square-type partitioning is applied to a main block according to an embodiment of the present invention.

FIG. 8 is a diagram illustrating the shapes into which a main block is partitioned according to an embodiment of the present invention.

(a) in FIG. 8 shows an example of the case where square-type partitioning is applied to the main block, and (b) in FIG. 8 shows an example of the case where rectangular-type partitioning is applied to the main block.

By means of square-type partitioning, four sub-blocks, each having ¼ of the size of the main block, may be generated.

Meanwhile, by means of rectangular-type partitioning, two sub-blocks, each having ½ of the size of the main block, may be generated.

In detail, as illustrated in (b) of FIG. 8, by means of vertical partitioning, two sub-blocks, each having ½ of the width of the main block, may be generated (see A in (b) of FIG. 8). Alternatively, by means of horizontal partitioning, two sub-blocks, each having ½ of the height of the main block, may be generated (see B in (b) of FIG. 8).

Rectangular-type partitioning, by which two sub-blocks having the same size are generated, may also be referred to as "symmetric rectangular-type partitioning".

By means of rectangular-type partitioning, a sub-block having ¼ of the size of the main block and a sub-block having ¾ of the size of the main block may also be generated.

C and D in (b) of FIG. 8 show examples in which a sub-block having ¼ of the size of the main block and a sub-block having ¾ of the size of the main block are generated by means of vertical partitioning.

E and F in (b) of FIG. 8 show examples in which a sub-block having ¼ of the size of the main block and a sub-block having ¾ of the size of the main block are generated by means of horizontal partitioning.

Rectangular-type partitioning by which two sub-blocks having different sizes are generated may also be referred to as "asymmetric rectangular-type partitioning".

Figure 9:
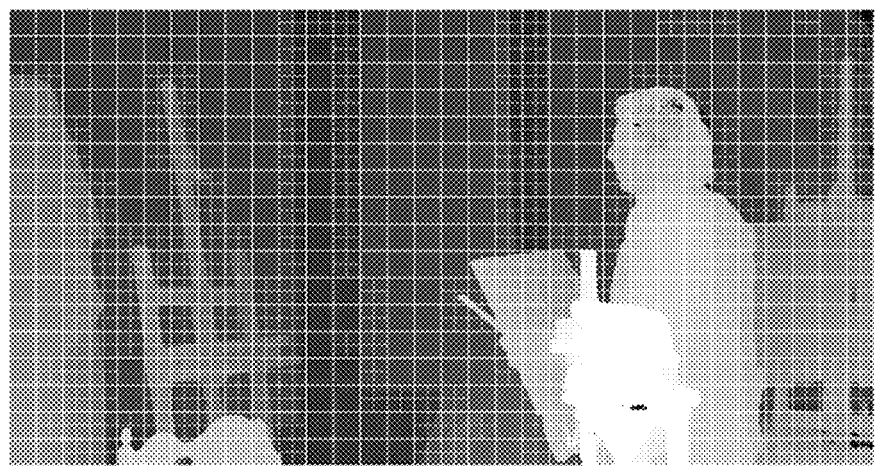
FIGS. 9 and 10 are diagrams illustrating the partitioning aspect of a frame according to an embodiment of the present invention.
Figure 10:
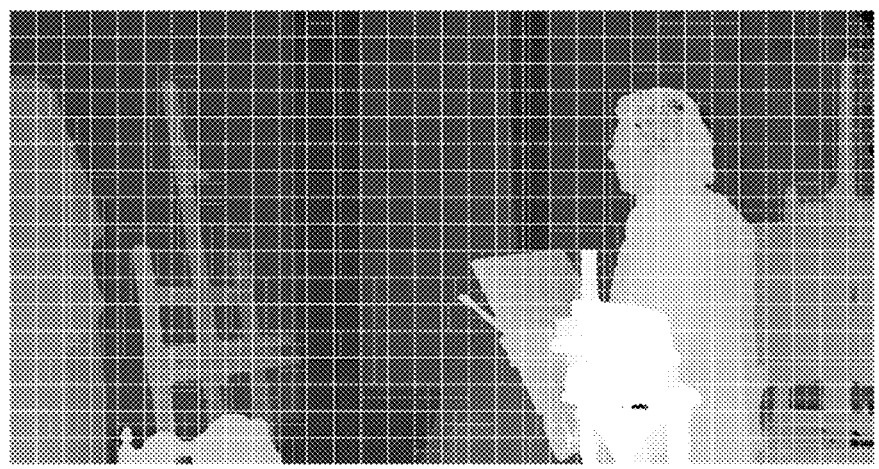

FIGS. 9 and 10 are diagrams illustrating partitioning aspects of a frame.

FIG. 9 is a diagram illustrating a partitioning aspect in the case where only quad-type partitioning is applicable as the partitioning shape of the main block, and FIG. 10 illustrates a partitioning aspect in the case where one of quad-tree partitioning and rectangular-type partitioning is selectively applied as the partitioning shape of the main block.

An encoder may apply the partitioning type (split type) that is usable in the main block, and may then determine whether the corresponding partitioning type (split type) is applicable to the main block. In detail, for each of sub-blocks generated when the partitioning type usable in the main block is applied, the difference between the maximum value and the minimum value of a depth range in the corresponding sub-block may be derived. Also, whether the corresponding partitioning type is applicable to the main block may be determined by comparing the difference between the maximum value and the minimum value of the depth range for at least one sub-block with a threshold value. In detail, when the difference for the at least one sub-block is greater than the threshold value, it may be determined that the corresponding partitioning type is not applicable to the main block.

In an example, when square-type partitioning is applied to the main block, the difference between the maximum value and the minimum value of the depth range of each of four sub-blocks may be derived. When the difference for at least one of the four sub-blocks is greater than the threshold value, it may be determined that square-type partitioning is not applied to the main block.

Whether the specific partitioning type is applicable to the main block may be determined based on whether the difference for at least one of the multiple sub-blocks is greater than the threshold value. Alternatively, whether the specific partitioning type is applicable to the main block may be determined based on whether the differences for all of the multiple sub-blocks are greater than the threshold value.

When there are multiple usable partitioning types, applicability of the partitioning types may be determined for each of the multiple partitioning types. For example, when both square-type partitioning and non-square-type partitioning are usable, applicability of partitioning types may be determined for each of the partitioning types (split types) illustrated in FIG. 8.

When there is a single partitioning type applicable to the main block, the partitioning type may be determined to be the partitioning type (split type) of the main block at step S703.

Meanwhile, when there are multiple partitioning types applicable to the main block, costs for respective partitioning types may be calculated, and thereafter the partitioning type having the optimal cost may be determined to be the partitioning type of the main block at step S703.

The cost for each partitioning type may be derived by summing costs for respective sub-blocks that are incurred when the corresponding partitioning type is applied to the main block. The cost of each sub-block may be derived based on the size of the corresponding sub-block and the difference between the maximum value and the minimum value of a depth range in the corresponding sub-block. The following Equation (3) shows an example of a method for calculating the cost of each sub-block.

$$\text{costVolume} = \text{blkSize}.x * \text{blkSize}.y * (Z_{max} - Z_{min} + 1) \quad (3)$$

In Equation (3), blkSize.x denotes the width of the sub-block and blkSize.y denotes the height of the sub-block. The cost of the partitioning type may be derived by summing the costs of respective sub-blocks (i.e., costVolume).

Among multiple partitioning types, the partitioning type having the lowest cost may be determined to be the partitioning type of the main block.

Information related to the partitioning type of the main block may be explicitly encoded and signaled. Here, since the probabilities of application of respective partitioning types are non-uniform, the numbers of bits required in order to represent respective partitioning types may be set to different values.

FIG. 11 is a diagram illustrating the results of experiments for testing the probability of each partitioning type (split type) occurring in a test sequence according to an embodiment of the present invention.

In consideration of the probability of occurrence of each partitioning type, a partitioning type having a higher probability may be set to be represented by a smaller number of bits. For this operation, at least one of a syntax element indicating whether a main block is partitioned into multiple sub-blocks, a syntax element indicating whether square-type partitioning is applied to the main block, a syntax element indicating the partitioning direction of the main block, a syntax element indicating whether the main block is partitioned in a symmetric shape, and a syntax element indicating whether a first sub-block, obtained by partitioning the main block, has a size larger than that of a second sub-block, may be encoded and signaled.

Figures 12, 13:
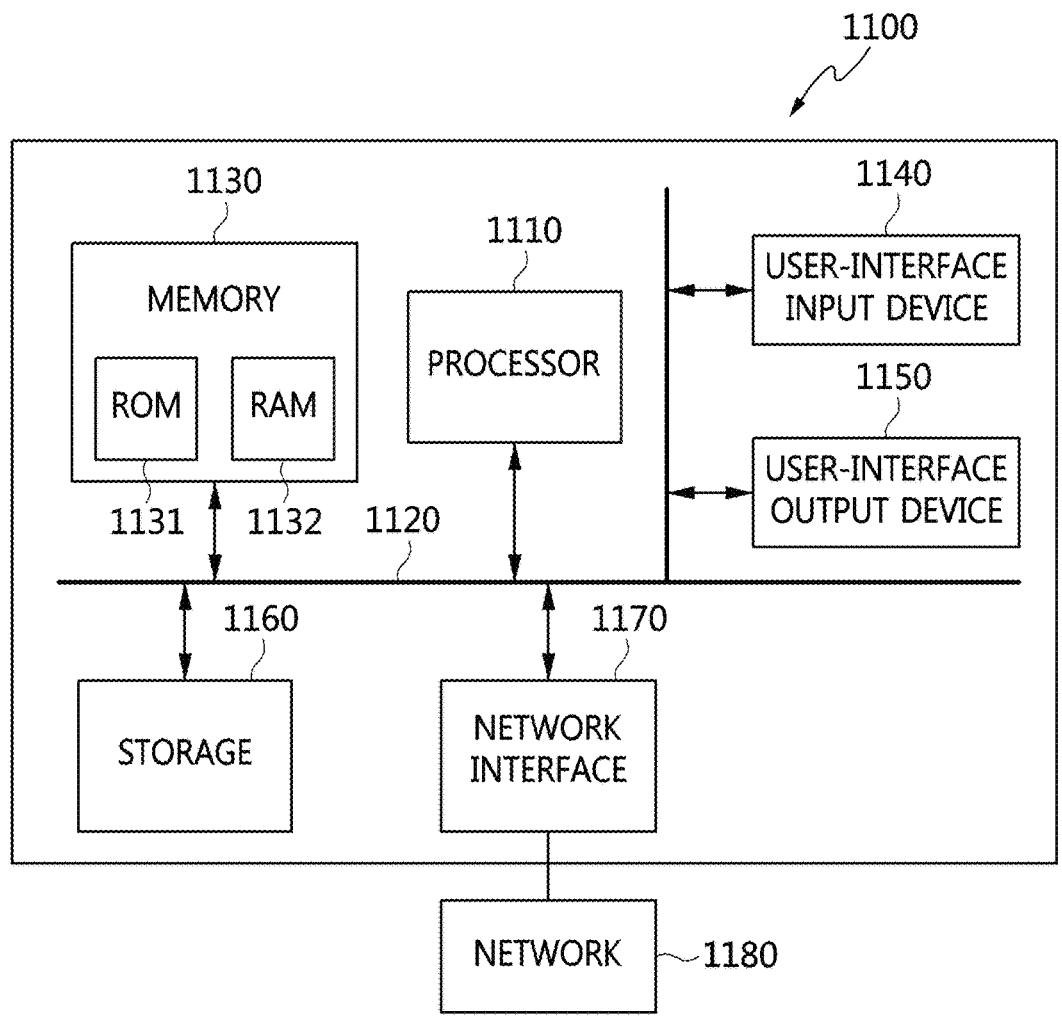
FIG. 12 is a diagram illustrating the values of syntax elements depending on the partitioning shapes of a main block according to an embodiment of the present invention.
FIG. 13 is a diagram illustrating a computer system according to an embodiment of the present invention.

FIG. 12 is a diagram illustrating the values of syntax elements depending on the split types of a main block according to an embodiment of the present invention.

The syntax element gas_split_flag indicates whether the main block is partitioned into multiple sub-blocks. A value of the syntax element gas_split_flag equal to 0 indicates that the main block is not partitioned into multiple sub-blocks, and a value of the syntax element gas_split_flag equal to 1 indicates that the main block is partitioned into multiple sub-blocks.

The syntax element gas_quad_flag indicates that square-type partitioning is applied to the main block. When the value of the syntax element gas_quad_flag is equal to 1, the main block may be partitioned into four square sub-blocks. In this case, the width and the height of each sub-block may be set to ½ of the width and height of the main block. A value of the syntax element gas_quad_flag equal to 0 indicates that rectangular-type partitioning is applied to the main block.

The syntax element gas_split_orientation_flag indicates whether the partitioning direction in the case of rectangular-type partitioning is a horizontal direction or a vertical direction. A value of the syntax element gas_split_orientation_flag equal to 0 means that the main block is partitioned in a horizontal direction, and a value of the syntax element gas_split_orientation_flag equal to 1 means that the main block is partitioned in a vertical direction.

The syntax element gas_split_symmetry_flag indicates whether rectangular-type partitioning is a symmetric shape or an asymmetric shape. A value of the syntax element gas_split_symmetry_flag equal to 0 indicates that asymmetric rectangular-type partitioning is applied. In this case, the main block may be split into a sub-block having a ¼ size and a sub-block having a ¾ size. A value of the syntax element gas_split_symmetry_flag equal to 1 indicates that symmetric rectangular-type partitioning is applied. In this case, the main block may be split into two sub-blocks, each having a ½ size.

The syntax element gas_split_first_block_bigger indicates whether a first sub-block generated through asymmetric rectangular-type partitioning is larger than a second sub-block. When the main block is partitioned in a horizontal direction, the first sub-block indicates the block located in the upper portion of the main block, and the second sub-block indicates the block located in the lower portion of the main block. When the main block is partitioned in a vertical direction, the first sub-block indicates the block located in the left portion of the main block, and the second sub-block indicates the block located in the right portion of the main block. A value of the syntax element gas_split_first_block_bigger equal to 0 indicates that the first sub-block has a size larger than that of the second sub-block. In this case, the first sub-block may have ¾ of the size of the main block, and the second sub-block may have ¼ of the size of the main block. A value of the syntax element gas_split_first_block_bigger equal to 1 indicates that the first sub-block is smaller than the second sub-block. In this case, the first sub-block may have ¼ of the size of the main block, and the second sub-block may have ¾ of the size of the main block.

A block that is not partitioned any further may be defined as a leaf block. For example, a main block that is not partitioned into sub-blocks and/or sub-blocks that are generated by partitioning the main block, may be defined as respective leaf blocks.

Information about the depth range of each leaf block may be encoded and signaled. That is, the information about the depth range may be encoded on a per-block basis. Here, in order to reduce the amount of information to be encoded between consecutive depth frames, depth information of the block belonging to the previous frame may be exploited. Below, a block that is the target of encoding/decoding of the depth estimation information, among the multiple leaf blocks, is referred to as the "current block". Also, a frame including the current block is referred to as the "current frame".

The previous frame indicates a frame that is encoded/decoded before the current frame, a frame that is prior to the current frame in a display order, or a frame that has a view identifier lower than that of the current frame by 1.

Whether the depth range of the current block is identical to the depth range of a block in the previous frame (hereinafter a previous block or a collocated block), having the same location and size as the current block in the current frame, may be determined. Here, the fact that the depth ranges of the two blocks are identical to each other may mean that the minimum values and the maximum values of the depth ranges of the two blocks are respectively identical to each other.

The locations of the current block and the collocated block may be determined based on the location of a sample in a top-left corner.

For example, when the depth ranges of the current block and the collocated block are identical to each other, encoding/decoding of depth estimation information of the current block may be skipped. The following Equation (4) shows an example in which whether encoding/decoding of depth estimation information of the current block is to be skipped is determined by comparing the depth information of the current block with the depth information of the collocated block.

$$\text{if}(currentBlock.Zmin < previousBlock.Zmin || currentBlock.Zmax > previousBlock.Zmax)\text{noSkip} \quad (4)$$

In Equation (4), currentBlock.Zmin and currentBlock.Zmax respectively indicate the minimum value and the maximum value of the depth range of the current block. Here, previousBlock.Zmin and previousBlock.Zmax respectively indicate the minimum value and the maximum value of the depth range of the collocated block.

When the minimum value currentBlock.Zmin of the depth range of the current block is less than the minimum value previousBlock.Zmin of the depth range of the previous block, or when the maximum value currentBlock.Zmax of the depth range of the current block is greater than the maximum value previousBlock.Zmax of the depth range of the previous block, a no-skip action (noSkip) for explicitly encoding/decoding information about the depth range of the current block may be performed.

Otherwise, encoding/decoding of the depth estimation information of the current block may be skipped. When encoding/decoding of the depth estimation information is skipped, the depth information of the current block may be set to be identical to the depth information of the collocated block. That is, the value of each pixel in the current block may be set to be identical to the value of the corresponding pixel in the collocated block.

Alternatively, when encoding/decoding of depth estimation information of the current block is skipped, the depth estimation information of the current block may be derived based on the depth information of the collocated block. In an example, the minimum value and the maximum value of the depth range of the current block may be derived with reference to the depth range of the collocated block.

When a block having the same size and same location as the current block is not present in the previous frame (e.g., when the partitioning shape of the main block is different), the determination procedure in Equation (4) may be skipped, and depth estimation information of the current block may be explicitly encoded/decoded.

Unlike the example in Equation (4), in consideration of whether the difference between the depth of the current block and the depth of the collocated block is not greater than a threshold value, whether depth estimation information is to be explicitly encoded/decoded may be determined. In detail, when the ratio between the maximum depth value that can be represented by one pixel and the difference between values in depth ranges of the current block and the collocated block is less than a threshold value, encoding/decoding of the depth estimation information of the current block may be skipped. Here, the maximum depth value that can be represented by one pixel may be determined by the bit depth of an image. For example, in a 10-bit image, the maximum depth value that can be represented by one pixel may be 1023 ($2^{10}$−1).

The following Equation (5) shows an example of the maximum depth value.

$$\text{if}(\text{ZminCurrPrevPerc} \geq \text{skipThresh} \| \text{ZmaxCurrPrevPerc} \geq \text{skipThresh} \| \text{SADPerc} \geq \text{skipThresh}) \text{noSkip} \quad (5)$$

In Equation (5), the variable ZminCurrPrevPerc indicates the ratio between the difference between the minimum values of the depth ranges of the current block and the collocated block and the maximum depth value (MAX DEPTH VALUE) that can be represented by one pixel. In detail, the variable ZminCurrPrevPerc may be one in which the ratio between the difference and the maximum depth value is represented as a percentage (%).

The variable ZmaxCurrPrevPerc indicates the ratio between the difference between the maximum values of the depth ranges of the current block and the collocated block and the maximum depth value that can be represented by one pixel. In detail, the variable ZmaxCurrPrevPerc may be one in which the ratio between the difference and the maximum depth value is represented as a percentage.

The variable SADPerc indicates the ratio between the sum of the absolute differences (SAD) between respective pixels in the current block and the previous block and the maximum depth value that can be represented by one pixel. In detail, the variable SADPerc may be one in which the ratio between the sum of the absolute differences (SAD) between respective pixels and the maximum depth value is represented as a percentage.

The variable skipThresh denotes a threshold value. The threshold value may be predefined by the encoder and the decoder. Alternatively, information indicating the threshold value may be explicitly encoded and signaled. Alternatively, the threshold value may be adaptively determined based on at least one of the size of a block, the partitioning shape of the block, a bit depth, and a quantization step.

As shown in the example in the following Equation (5), when at least one of the variable ZminCurrPrevPerc, the variable ZmaxCurrPrevPerc, and the variable SADPerc is equal to or greater than the threshold value skipThresh, a noSkip action for explicitly encoding/decoding the depth estimation information of the current block may be performed.

Otherwise, encoding/decoding of the depth estimation information of the current block may be skipped. When encoding/decoding of the depth estimation information is skipped, the depth information of the current block may be set to be identical to the depth information of the collocated block. That is, the value of each pixel in the current block may be set to be identical to the value of the corresponding pixel in the collocated block.

Alternatively, when encoding/decoding of depth estimation information of the current block is skipped, the depth estimation information of the current block may be derived based on the depth information of the collocated block. In an example, the minimum value and the maximum value of the depth range of the current block may be derived with reference to the depth range of the collocated block.

Whether depth estimation information is to be explicitly encoded/decoded may be determined using any one of Equation (4) and Equation (5). Alternatively, when the condition in Equation (4) is satisfied, whether the condition of Equation (5) is additionally satisfied may be determined, and thus whether depth estimation information is to be explicitly encoded/decoded may be determined.

When it is determined that depth estimation information of the block is to be explicitly encoded/decoded, information indicating the minimum value of the depth range in the block and information indicating the maximum value of the depth range may be respectively encoded/decoded.

Here, the minimum value of the depth range and the maximum value of the depth range may be encoded/decoded without change.

Alternatively, the minimum value and/or the maximum value of the depth range of a block spatially or temporally neighboring the current block may be set to a prediction value for the minimum value of the depth range of the current block and/or a prediction value for the maximum value of the depth range. In this case, the difference between the minimum value of the depth range of the current block and the prediction value for the minimum value of the depth range and the difference between the maximum value of the depth range of the current block and the prediction value for the maximum value of the depth range may be encoded/decoded.

Here, the spatially neighboring block may include a block located adjacent to the left side of the current block (i.e., a left neighboring block), a block located adjacent to the top of the current block (i.e., top neighboring block), a block located adjacent to the top-left portion of the current block, a block located adjacent to the top-right portion of the current block, and a block located adjacent to the bottom-left portion of the current block.

When multiple neighboring blocks are used as prediction candidates, information for specifying one of the multiple neighboring blocks may be additionally encoded/decoded. For example, when the block located adjacent to the left side of the current block and the block located adjacent to the top of the current block are used as candidates, a flag for specifying one of the two blocks may be additionally encoded/decoded.

A prediction block for deriving the prediction value for the minimum value of the depth range of the current block and the prediction value for the maximum value of the depth range may be individually determined. For example, a determination of a neighboring block to be used to derive the prediction value for the minimum value of the depth range of the current block, among top neighboring blocks and left neighboring blocks, and a determination of a neighboring block to be used to derive the prediction value for the maximum value of the depth range of the current block, among the top neighboring blocks and the left neighboring blocks, may be independently performed. In this case, information for specifying the neighboring block to be used to derive the prediction value for the minimum value of the depth range of the current block and information for specifying the neighboring block to be used to derive the prediction value for the maximum value of the depth range of the current block may be individually encoded/decoded.

The number of neighboring block candidates to be used to predict the depth range of the current block may be determined differently depending on the partitioning shape of the block. For example, when the current block is generated by partitioning the main block in a horizontal direction, only the block located adjacent to the top of the current block (top neighboring block) may be set as a neighboring block candidate. That is, when the current block is generated by partitioning the main block in a horizontal direction, the minimum value and the maximum value of the depth range of the top neighboring block may be respectively set to a prediction value for the minimum value of the depth range of the current block and a prediction value for the maximum value of the depth range.

Meanwhile, when the current block is generated by partitioning the main block in a vertical direction, only a block adjacent to the left side of the current block (i.e., a left neighboring block) may be set as a neighboring block candidate. That is, when the current block is generated by partitioning the main block in a vertical direction, the minimum value and the maximum value of the depth range of the left neighboring block may be respectively set to a prediction value for the minimum value of the depth range of the current block and a prediction value for the maximum value of the depth range of the current block.

Meanwhile, when the current block is generated by applying square-type partitioning to the main block, information indicating one of the left neighboring block and the top neighboring block from which the prediction value for the minimum value of the depth range of the current block is derived and information indicating one of the left neighboring block and the top neighboring block from which the prediction value for the maximum value of the depth range of the current block is derived may be explicitly encoded/decoded.

In another example, the number of neighboring block candidates to be used to predict the depth range of the current block may be determined differently depending on whether the current block is located adjacent to the boundary of a frame (e.g., a projection plane). For example, when the current block is adjacent both to the top boundary and to the left boundary of the frame (i.e., when the current block is a first block in the frame), a neighboring block located adjacent to the top of the current block and a neighboring block adjacent to the left side of the current block are not present. In this case, the prediction value for the minimum value of the depth range of the current block and the prediction value for the maximum value of the depth range may be set to a default value. The default value may be '0'. Alternatively, information indicating the default value may be explicitly encoded and signaled.

Alternatively, when the current block is adjacent both to the top boundary and to the left boundary of the frame, the minimum value and the maximum value of the depth range of the first block of the previous frame may be respectively set to a prediction value for the minimum value of the depth range of the current block and a prediction value for the maximum value of the depth range.

When the current block is adjacent to the top boundary of the frame, but is not adjacent to the left boundary thereof, a neighboring block located adjacent to the top of the current block is not present. In this case, only a block adjacent to the left side of the current block may be set as a neighboring block candidate. That is, the minimum value and the maximum value of the depth range of the left neighboring block may be respectively set to a prediction value for the minimum value of the depth range of the current block and a prediction value for the maximum value of the depth range.

When the current block is adjacent to the left boundary of the frame, but is not adjacent to the top boundary thereof, a neighboring block adjacent to the left side of the current block is not present. In this case, only a block located above the current block may be set as a neighboring block candidate. That is, the minimum value and the maximum value of the depth range of the top neighboring block may be respectively set to a prediction value for the minimum value of the depth range of the current block and a prediction value for the maximum value of the depth range.

When the minimum value or the maximum value of the depth range of the block is encoded without change, a maximum of 32 bits may be used. In contrast, when the difference in the minimum value of the depth range of the block or the difference in the maximum value of the depth range is encoded, a maximum of 16 bits may be used. That is, instead of encoding/decoding the depth range without change, the depth range of the block may be encoded/decoded based on the block partitioning structure, thus improving image compression efficiency.

Table 1 shows a syntax table including syntax elements proposed in the present invention.

TABLE 1

|  | Descriptor |
|---|---|
| geometry_assistance( payloadSize ) { |  |
|   gas_qs | ue(v) |
|   gas_bw | ue(v) |
|   for( v = 0; v <= mvp_num_views_minus1; v++ ) { |  |
|     viewID = ViewIndexToID[ v ] |  |
|     for( 1 = 0; 1 < (ci_projection_plane_height_minus1[ viewID ] + gas_bw ) /gas_bw; 1++ ) { |  |
|       for( c = 0; c < (ci_projection_plane_width_minus1[ viewID ] + gas_bw ) / gas_bw; c++ ) { |  |
|         gas_split_flag | u(1) |
|         subBlocksHorizontally = 1 |  |
|         subBlocksVertically = 1 |  |
|         if( gas_split_flag ) { |  |
|           gas_quad_split_flag | u(1) |
|           if( gas_quad_split_flag ) { |  |
|             subBlocksHorizontally = 2 |  |
|             subBlocksVertically = 2 |  |
|           } else { |  |

TABLE 1-continued

|  | Descriptor |
|---|---|
| `gas_split_orientation_flag` | u(1) |
| `if( gas_split_orientation_flag ) {` | |
| `    subBlocksHorizontally = 2` | |
| `} else {` | |
| `    subBlocksVertically = 2` | |
| `}` | |
| `gas_split_symmetry_flag` | u(1) |
| `if( !gas_split_symmetry_flag ) {` | |
| `    gas_split_first_block_bigger` | u(1) |
| `}` | |
| `}` | |
| `}` | |
| `for( sbl = 0; sbl < subBlocksVertically; sbl++ ) {` | |
| `    for( sbc = 0; sbc < subBlocksHorizontally; sbc++ ) {` | |
| `        gas_skip_flag` | u(1) |
| `        if( gas_skip_flag ) {` | |
| `            if( l == 0 && c == 0 && sbl == 0 && sbc == 0 ) { /*None*/` | |
| `                LTMinFlag = 2` | |
| `                LTMaxFlag = 2` | |
| `            }` | |
| `            else if( l == 0 && sbl == 0 ) { /*Left*/` | |
| `                LTMinFlag = 0` | |
| `                LTMaxFlag = 0` | |
| `            }` | |
| `            else if( c == 0 && sbc == 0 ) /*Top*/` | |
| `                LTMinFlag = 1` | |
| `                LTMaxFlag = 1` | |
| `            }` | |
| `            else {` | |
| `                gas_ltmin_flag` | u(1) |
| `                gas_ltmax_flag` | u(1) |
| `                LTMinFlag = gas_ltmin_flag` | |
| `                LTMaxFlag = gas_ltmax_flag` | |
| `            }` | |
| `            zmin_delta` | ue(v) |
| `            zmax_delta` | ue(v) |
| `        }` | |
| `    }` | |
| `}` | |
| `}` | |
| `}` | |
| `}` | |

The syntax element gas_qs indicates the value of a quantization step used for the boundary of a depth range. The variable Qstep, indicating a quantization step, may be set to a value indicated by the syntax element gas_qs.

The syntax element gas_bw indicates the width and/or the height of a main block in a picture having viewID as an ID. The syntax element gas_bw may be an integer corresponding to the power of 2, and may have a value greater than 4.

The syntax element gas_split_flag indicates whether the current block is partitioned into multiple sub-blocks.

The syntax element gas_quad_split_flag indicates whether square-type partitioning is applied to the current block. A value of the syntax element gas_quad_split_flag equal to 0 indicates that the current block is partitioned into two rectangular sub-blocks, and a value of the syntax element gas_quad_split_flag equal to 1 indicates that the current block is partitioned into four square sub-blocks.

The syntax element gas_split_orientation_flag indicates whether the current block is partitioned in a horizontal direction or a vertical direction. A value of the syntax element gas_split_orientation_flag equal to 0 indicates that the current block is partitioned in a horizontal direction. A value of the syntax element gas_split_orientation_flag equal to 1 indicates that the current block is partitioned in a vertical direction.

The syntax element gas_split_symmetry_flag indicates whether two sub-blocks generated by partitioning the current block have different sizes. A value of the syntax element gas_split_symmetry_flag equal to 0 indicates that the sizes of the two sub-blocks are different from each other. A value of the syntax element gas_split_symmetry_flag equal to 1 indicates that the sizes of the two sub-blocks are identical to each other.

The syntax element gas_split_first_block_bigger indicates whether the size of the first sub-block is greater than that of the second sub-block. A value of the syntax element gas_split_orientation_flag equal to 0 indicates that the first sub-block is a sub-block located in the left portion of the current block, and a value of the syntax element gas_split_orientation_flag equal to 1 indicates that the first sub-block is a sub-block located in the upper portion of the current block. A value of the syntax element gas_split_first_block_bigger equal to 0 indicates that the first sub-block has a size larger than that of the second sub-block. A value of the syntax element gas_split_first_block_bigger equal to 1 indicates that the first sub-block has a size less than that of the second sub-block.

The syntax element gas_skip_flag indicates whether depth estimation information of the current block is explicitly encoded/decoded. When the value of the syntax element gas_skip_flag is 0, the bitstream may include the syntax elements zmin_delta and gas_ltmin_flag, related to the minimum value of the depth range of the current block, and the syntax elements zmax_delta and gas_ltmax_flag, related to the maximum value of the depth range.

When the value of the syntax element gas_skip_flag is 1, a bitstream does not include the depth estimation information of the current block. In this case, the depth information of the current block may be set to be identical to the depth information of a previous block in a previous frame (i.e., a collocated block).

That is, by means of the syntax element gas_skip_flag, whether the depth estimation information of the current block is to be updated may be determined. When it is determined that update of the depth estimation information of the current block is to be skipped based on the syntax element gas_skip_flag, the depth information of the previous frame may be reused. In contrast, when it is determined that the update of the depth estimation information of the current block is not to be skipped based on the syntax element gas_skip_flag, the depth information of the current block may be estimated based on the depth estimation information (the minimum value of the depth range and the maximum value of the depth range) of the current block.

The syntax element gas_ltmin_flag specifies the block to be used to derive a prediction value for the minimum value of the depth range of the current block. For example, a value of the syntax element gas_ltmin_flag equal to 0 means that the minimum value of the depth range of the left neighboring block of the current block is set to a prediction value for the minimum value of the depth range of the current block. A value of the syntax element gas_ltmin_flag equal to 1 means that the minimum value of the depth range of the top neighboring block of the current block is set to a prediction value for the minimum value of the depth range of the current block.

The syntax element gas_ltmax_flag specifies the block to be used to derive a prediction value for the maximum value of the depth range of the current block. For example, a value of the syntax element gas_ltmax_flag equal to 0 means that the maximum value of the depth range of the left neighboring block of the current block is set to a prediction value for the maximum value of the depth range of the current block. A value of the syntax element gas_ltmax_flag equal to 1 means that the maximum value of the depth range of the top neighboring block of the current block is set to a prediction value for the maximum value of the depth range of the current block.

The syntax element zmin_delta indicates the difference between the minimum value of the depth range and the prediction value for the minimum value of the depth range. The decoder may derive the minimum value of the depth range by adding the prediction value for the minimum value of the depth range to the difference. Here, the difference value may be derived by obtaining a value, indicated by the quantization step, with respect to the value of the syntax element zmin_delta.

The syntax element zmax_delta indicates the difference between the maximum value of the depth range and the prediction value for the maximum value of the depth range. The decoder may derive the maximum value of the depth range by adding the prediction value for the maximum value of the depth range to the difference. Here, the difference value may be derived by obtaining a value, indicated by the quantization step, with respect to the value of the syntax element zmax_delta.

The following Equations (6) and (7) show examples in which the minimum value and the maximum value of the depth range of the current block are derived.

$$ZMin = (LTMinFlag == 2 ? 0 : LTMinFlag == 1 ? ZMinTop : ZMinLeft) + QStep * zmindelta \quad (6)$$

$$ZMax = (LTMaxFlag == 2 ? 0 : LTMaxFlag == 1 ? ZMinTop : ZMinLeft) + QStep * zmaxdelta \quad (7)$$

The variable ZMinLeft denotes the minimum value of the depth range of a left neighboring block, and the variable ZMaxLeft denotes the maximum value of the depth range of the left neighboring block. The variable ZMinTop denotes the minimum value of the depth range of a top neighboring block, and the variable ZMaxTop denotes the maximum value of the depth range of the top neighboring block.

QStep indicates the value of the quantization step. zmindelta indicates the value indicated by the syntax element zmin_delta, and zmaxdelta indicates the value indicated by the syntax element zmax_delta.

The variables LTMinFlag and LTMaxFlag specify the neighboring block to be used to derive a prediction value for the minimum value of the depth range and a prediction value for the maximum value of the depth range, respectively. For each of the two variables, a value equal to 1 indicates that a top neighboring block is used to derive the prediction value, and a value equal to 0 indicates that a left neighboring block is used to derive the prediction value. A value equal to 2 indicates that neither a top neighboring block nor a left neighboring block is used to derive the prediction value. In this case, the prediction value may be set to a default value (e.g., 0).

The syntax table shown in Table 1 may be encoded/decoded in the form of a Supplementary Enhancement Information (SEI) message. In detail, an SEI message including information about the depth range and the block partitioning structure shown in Table 1 may be referred to as a depth assistance (geometry assistance) SEI message.

The depth assistance SEI message may include information about block partitioning for each view. The decoder may perform depth estimation for each view using the depth assistance SEI message.

When the depth estimation information and information related to the block partitioning structure are transmitted through the SEI message, it may be useful for a profile in which depth information is not essential (e.g., a geometry absent profile). Through the depth assistance SEI message, the complexity of the depth estimation process performed by the decoder may be reduced.

FIG. 13 is a diagram illustrating a computer system according to an embodiment of the present invention.

Referring to FIG. 13, each of an immersive video processing apparatus and an immersive video output apparatus according to embodiments of the present invention may be implemented in a computer system 1100, such as a computer-readable storage medium. As illustrated in FIG. 13, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The names of syntax elements introduced in the foregoing embodiments are provisionally assigned to merely describe the embodiments of the present invention. The syntax elements may be referred to by names other than those proposed in the present invention.

In the above-described embodiments, although the methods have been described based on flowcharts as a series of steps or units, the present invention is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the invention.

The above-described embodiments include various aspects of examples. Although not all possible combinations for indicating various aspects can be described, those skilled in the art will recognize that additional combinations other than the explicitly described combinations are possible. Therefore, it may be appreciated that the present invention includes all other replacements, changes, and modifications belonging to the accompanying claims.

The above-described embodiments according to the present invention may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

In accordance with the present invention, depth information of a depth frame may be encoded/decoded on a per-block basis, thus reducing the bit rate for encoding/decoding depth information.

The effects of the present invention are not limited to the above-mentioned effects, and those skilled in this art will be able to easily understand other unmentioned effects from the following description.

As described above, although the present invention has been described based on specific details such as detailed components and a limited number of embodiments and drawings, those are merely provided for easy understanding of the entire invention, the present invention is not limited to those embodiments, and those skilled in the art will practice various changes and modifications from the above description.

Accordingly, it should be noted that the spirit of the present invention is not limited to the above-described embodiments, and the accompanying claims and equivalents and modifications thereof fall within the scope of the present disclosure.

What is claimed is:

1. An immersive video decoding method comprising:
partitioning a current picture into multiple main blocks;
determining whether each main block is to be partitioned into multiple sub-blocks; and
when it is determined that each main block is to be partitioned into multiple sub-blocks, determining a partitioning type of the corresponding main block,
wherein the corresponding main block is partitioned into four or two sub-blocks depending on the partitioning type,
wherein, when the corresponding main block is partitioned into multiple sub-blocks, a skip flag, indicating whether depth estimation information is present in a bitstream or not, is decoded for each of the multiple sub-blocks,
wherein when the skip flag for a current sub-block, which is one of the multiple sub-blocks, indicates that the depth estimation information is not included in the bitstream, a depth range of the current sub-block is not updated from a depth range of a collocated block in a previous picture, and
wherein when the skip flag for the current sub-block indicates that the depth estimation information is included in the bitstream, the depth range of the current sub-block is derived based on a spatial neighboring block adjacent to the current sub-block as well as the depth estimation information decoded from the bitstream.

2. The immersive video decoding method of claim 1, wherein:
the depth estimation information includes minimum delta information indicating a difference in a minimum value of the depth range of the current sub-block and maximum delta information indicating a difference in a maximum value of the depth range of the current sub-block.

3. The immersive video decoding method of claim 2,
wherein the minimum value of the depth range of the current sub-block is derived as a sum of a predicted minimum value and the difference specified by the minimum delta information, and
wherein the predicted minimum value is derived from the spatial neighboring block.

4. The immersive video decoding method of claim 3, wherein:
the spatial neighboring block represents one of a top neighboring block and a left neighboring block of the first sub-block, and
a syntax element for specifying one of the top neighboring block and the left neighboring block is further decoded from the bitstream.

5. The immersive video decoding method of claim 3, wherein:
when the first sub-block is adjacent to a top boundary of the current picture, the predicted minimum value is derived from a left neighboring block of the first sub-block, and when the first sub-block is adjacent to a left boundary of the current picture, the predicted minimum value is derived from a top neighboring block of the first sub-block.

6. The immersive video decoding method of claim 3, wherein, when the first sub-block is adjacent both to a top boundary and to a left boundary of the current picture, the predicted minimum value is set to a default value.

7. An immersive video encoding method comprising:
partitioning a current picture into multiple main blocks;
determining whether each main block is to be partitioned into multiple sub-blocks; and
determining a partitioning type of the corresponding main block,
wherein the corresponding main block is partitioned into four or two sub-blocks depending on the partitioning type,
wherein, when the corresponding main block is partitioned into multiple sub-blocks, a skip flag, indicating whether depth estimation information is present in a bitstream or not, is encoded for each of the multiple sub-blocks,
wherein when the skip flag for a current sub-block, which is one of the multiple sub-blocks, is encoded with a value indicating that the depth estimation information is not included in the bitstream, a depth range of the current sub-block is identical to a depth range of a collocated block in a previous picture, and
wherein when the skip flag for the current sub-block is encoded with a value indicating that the depth estimation information is included in the bitstream, the depth estimation information including depth difference information with a spatial neighboring block adjacent to the current sub-block is further encoded into the bitstream.

8. The immersive video encoding method of claim 7, wherein:
the partitioning type of the main block is selected from among one or more partitioning type candidates that are usable in the main block, among multiple partitioning type candidates, and
the partitioning type candidates include at least one of square-type partitioning, symmetric horizontal rectangular-type partitioning, symmetric vertical rectangular-type partitioning, asymmetric horizontal rectangular-type partitioning, and asymmetric vertical rectangular-type partitioning.

9. The immersive video encoding method of claim 8, wherein:
whether a first partitioning type candidate, among the multiple partitioning type candidates, is usable in the main block is determined based on whether difference information of at least one of sub-blocks generated when the first partitioning type candidate is applied to the main block is greater than a second threshold value, and
the difference information is a difference between a maximum value and a minimum value of a depth range of the corresponding sub-block.

10. The immersive video encoding method of claim 7, wherein:
the spatial neighboring block represents one of a top neighboring block and a left neighboring block of the first sub-block, and
a syntax element for specifying one of the top neighboring block and the left neighboring block is further encoded into the bitstream.

11. The immersive video encoding method of claim 7, wherein:
the depth difference information includes a difference between a minimum value of the depth range of the current sub-block and a prediction value for the minimum value of the depth range, and
the prediction value for the minimum value of the depth range is a minimum value of a depth range of the spatial neighboring block.

12. The method of claim 11, wherein, when the first sub-block is adjacent both to a top boundary and to a left boundary of the current picture, the prediction value is set to a default value.

13. The method of claim 7, wherein whether the corresponding main block is to be partitioned is determined based on whether a difference between a maximum value and a minimum value of a depth range of the main block is greater than a first threshold value.

* * * * *